US012739677B2

(12) United States Patent
Hwang et al.

(10) Patent No.: US 12,739,677 B2
(45) Date of Patent: Sep. 15, 2026

(54) OPERATION OF UE FOR UPDATING EPHEMERIS INFORMATION ON NTN SATELLITE

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Jinwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 18/270,656

(22) PCT Filed: Jan. 12, 2022

(86) PCT No.: PCT/KR2022/000552
§ 371 (c)(1),
(2) Date: Jun. 30, 2023

(87) PCT Pub. No.: WO2022/154473
PCT Pub. Date: Jul. 21, 2022

(65) Prior Publication Data

US 2024/0063897 A1 Feb. 22, 2024

(30) Foreign Application Priority Data

Jan. 15, 2021 (KR) ........................ 10-2021-0006161

(51) Int. Cl.
*H04B 7/185* (2006.01)
*H04B 17/20* (2015.01)
(Continued)

(52) U.S. Cl.
CPC ........ *H04W 24/10* (2013.01); *H04B 7/18519* (2013.01); *H04B 7/1853* (2013.01);
(Continued)

(58) Field of Classification Search
CPC ........ G01S 19/01–37; H04B 7/14–195; H04B 17/0082–409; H04W 4/02–029;
(Continued)

(56) References Cited

U.S. PATENT DOCUMENTS

2019/0041526 A1 2/2019 Lucky et al.
2023/0239043 A1* 7/2023 Xu ........................ H04B 7/185
(Continued)

FOREIGN PATENT DOCUMENTS

CN 110536477 A 12/2019
WO WO 2020/030715 A1 2/2020
(Continued)

OTHER PUBLICATIONS

Ericsson, "Ephemeris data," R2-1914195, 3GPP TSG-RAN WG2 #107bis, Chongqing, China, Oct. 14-18, 2019, 6 pages.
(Continued)

*Primary Examiner* — Timothy J Weidner
(74) *Attorney, Agent, or Firm* — Fish & Richardson P.C.

(57) ABSTRACT

A disclosure of the present specification provides a method for performing communication by a user equipment (UE). The method comprises the steps of: receiving EPHEMERIS information on an NTN satellite and timer information on the EPHEMERIS information from a base station serving as a non-terrestrial network (NTN) gateway; operating a timer on the basis of the timer information; performing communication via the NTN satellite on the basis of the EPHEMERIS information; and on the basis of expiration of the timer, transmitting a request to update the EPHEMERIS information to the base station.

9 Claims, 15 Drawing Sheets

(51) Int. Cl.

| | |
|---|---|
| ***H04B 17/24*** | (2015.01) |
| ***H04W 24/08*** | (2009.01) |
| ***H04W 24/10*** | (2009.01) |
| ***H04W 36/24*** | (2009.01) |
| ***H04W 36/30*** | (2009.01) |
| ***H04W 64/00*** | (2009.01) |
| ***H04W 84/06*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.

CPC ........... *H04B 17/24* (2015.01); *H04B 17/254* (2023.05); *H04W 24/08* (2013.01); *H04W 36/249* (2023.05); *H04W 36/30* (2013.01); *H04W 64/003* (2013.01); *H04W 64/006* (2013.01); *H04W 84/06* (2013.01); *H04W 88/02* (2013.01); *H04W 88/08* (2013.01); *H04W 92/02* (2013.01); *H04W 92/10* (2013.01)

(58) Field of Classification Search

CPC ..... H04W 8/18–245; H04W 24/02–10; H04W 36/0005–385; H04W 48/02–20; H04W 56/00–0095; H04W 64/003–006; H04W 84/02–16; H04W 88/005–188; H04W 92/02–24

See application file for complete search history.

(56) References Cited

U.S. PATENT DOCUMENTS

| | | | | |
|---|---|---|---|---|
| 2023/0388875 | A1* | 11/2023 | Gao ........................ | H04B 7/185 |
| 2024/0063894 | A1* | 2/2024 | Vogedes ................. | H04B 7/185 |

FOREIGN PATENT DOCUMENTS

| | | | | |
|---|---|---|---|---|
| WO | WO 2020/163610 | A1 | 8/2020 | |
| WO | WO 2020/165244 | A1 | 8/2020 | |
| WO | 2020/229445 | A1 | 11/2020 | |
| WO | WO-2021066696 | A1 * | 4/2021 | ............. H04B 7/185 |

OTHER PUBLICATIONS

Ericsson, "On UL time and frequency synchronization enhancements for NTN," R1-2005502, 3GPP TSG-RAN WG1 Meeting #102-e, e-Meeting, Aug. 17-28, 2020, 13 pages.

Extended European Search Report in European Appln. No. 22739668.6, mailed on Dec. 11, 2024, 16 pages.

Huawei, HiSilicon, "Discussion on RRC_IDLE mode issues in NTN," R2-2007171, 3GPP TSG RAN WG2 #111-e, Online, Aug. 17-28, 2020, 4 pages.

Office Action in Chinese Appln. No. 202280010168.3, mailed on Jan. 17, 2026, 15 pages (with English translation).

Office Action in Korean Appln. No. 10-2023-7020628, mailed on Mar. 3, 2026, 15 pages (with English translation).

* cited by examiner

Figure 1:
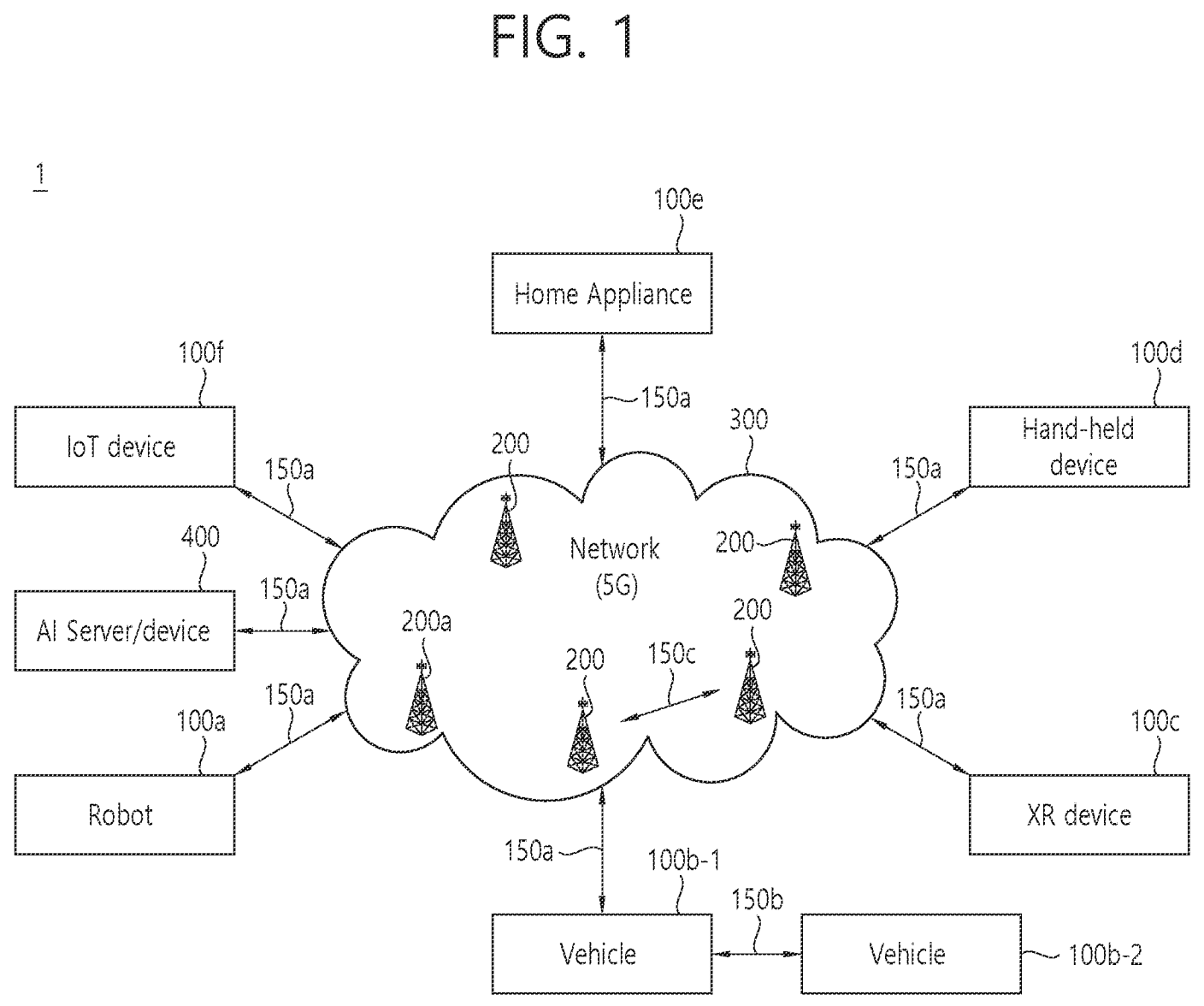

100f IoT device
400 AI Server/device
100a Robot
150a
150a
150a
300 Network (5G)
200
200
200
200
200a
150c
100e Home Appliance
150a
100d Hand-held device
150a
100c XR device
150a
100b-1 Vehicle
150a
150b
100b-2 Vehicle

FIG. 2

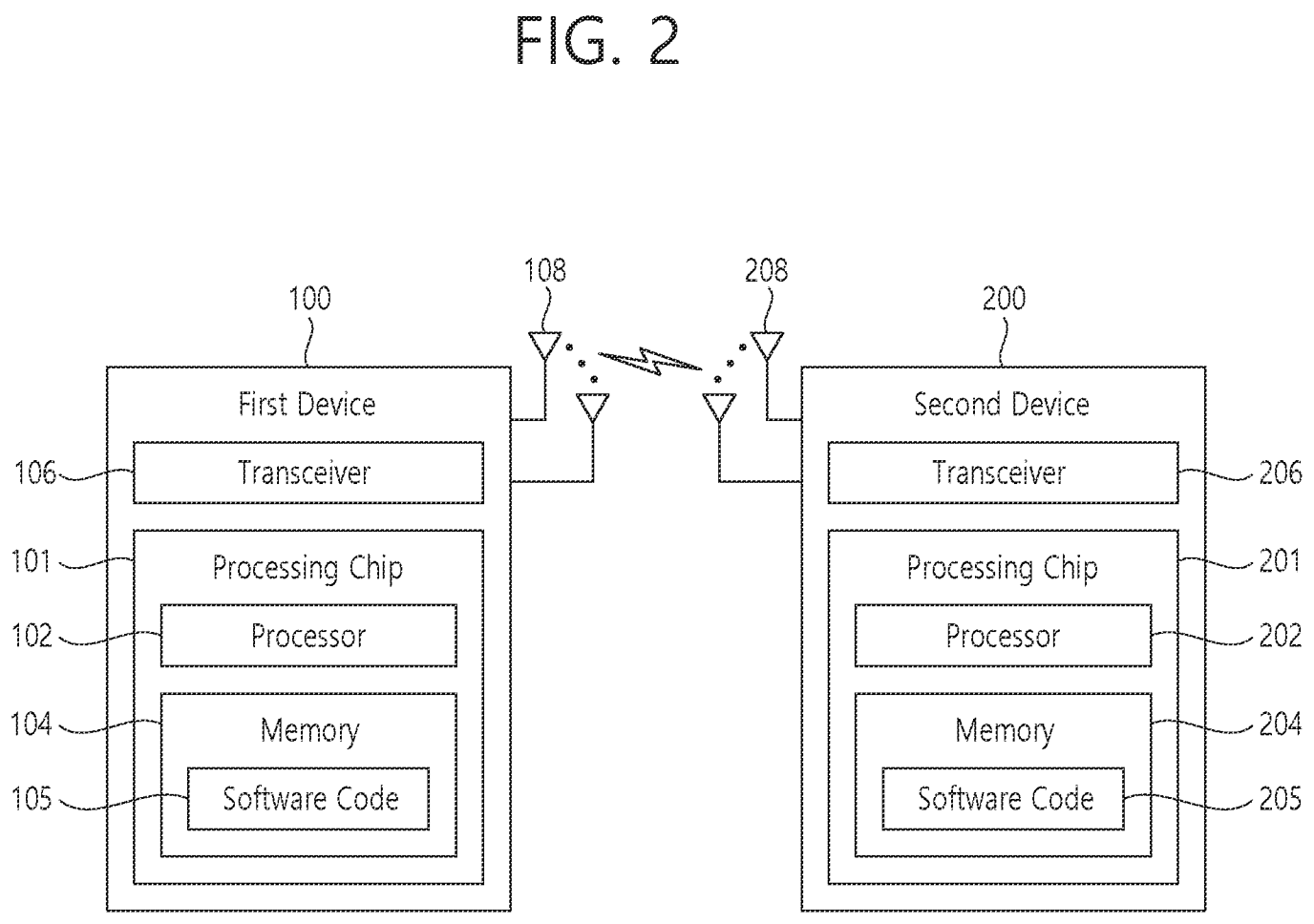

100 First Device
106 Transceiver
101 Processing Chip
102 Processor
104 Memory
105 Software Code
108

200 Second Device
206 Transceiver
201 Processing Chip
202 Processor
204 Memory
205 Software Code
208

FIG. 3

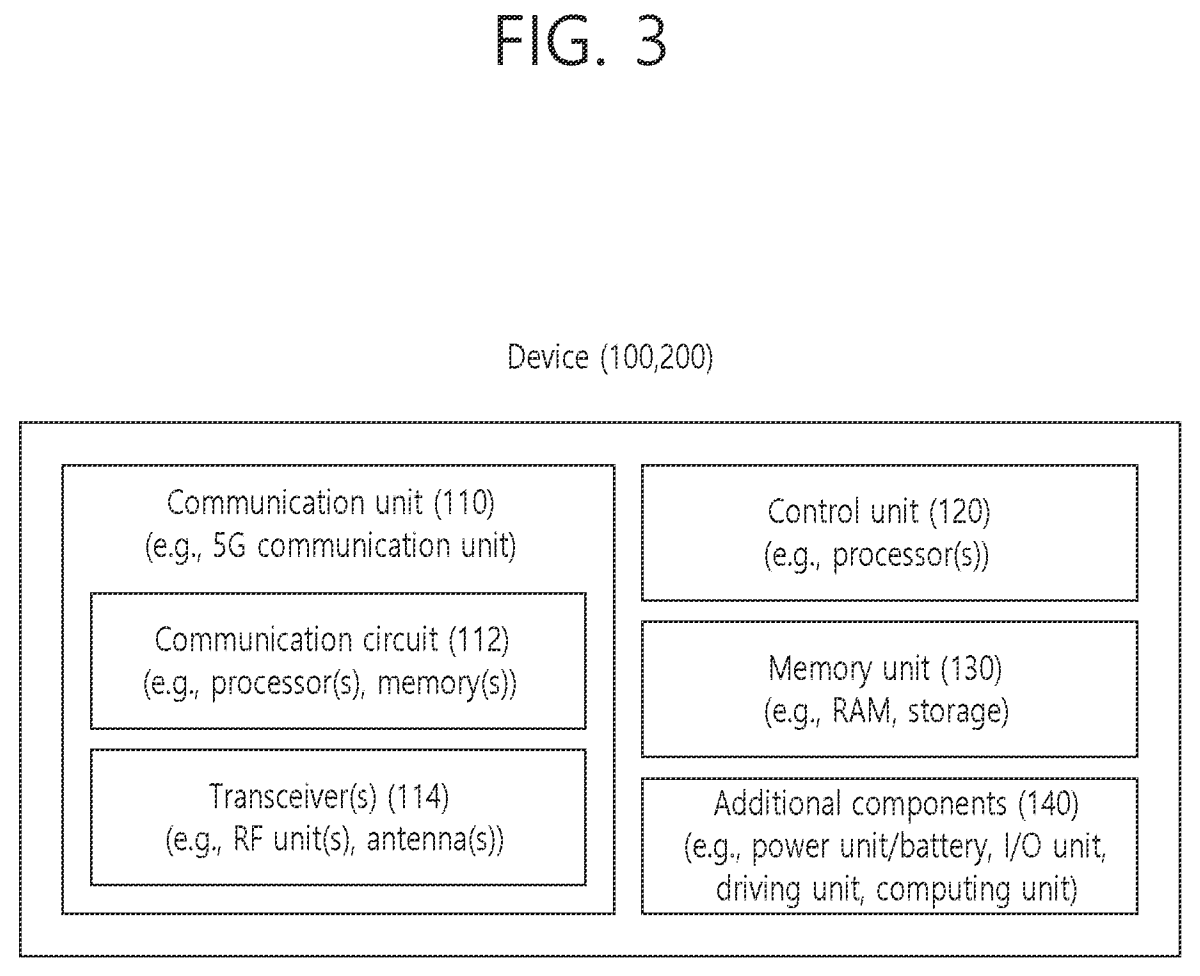

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

FIG. 14

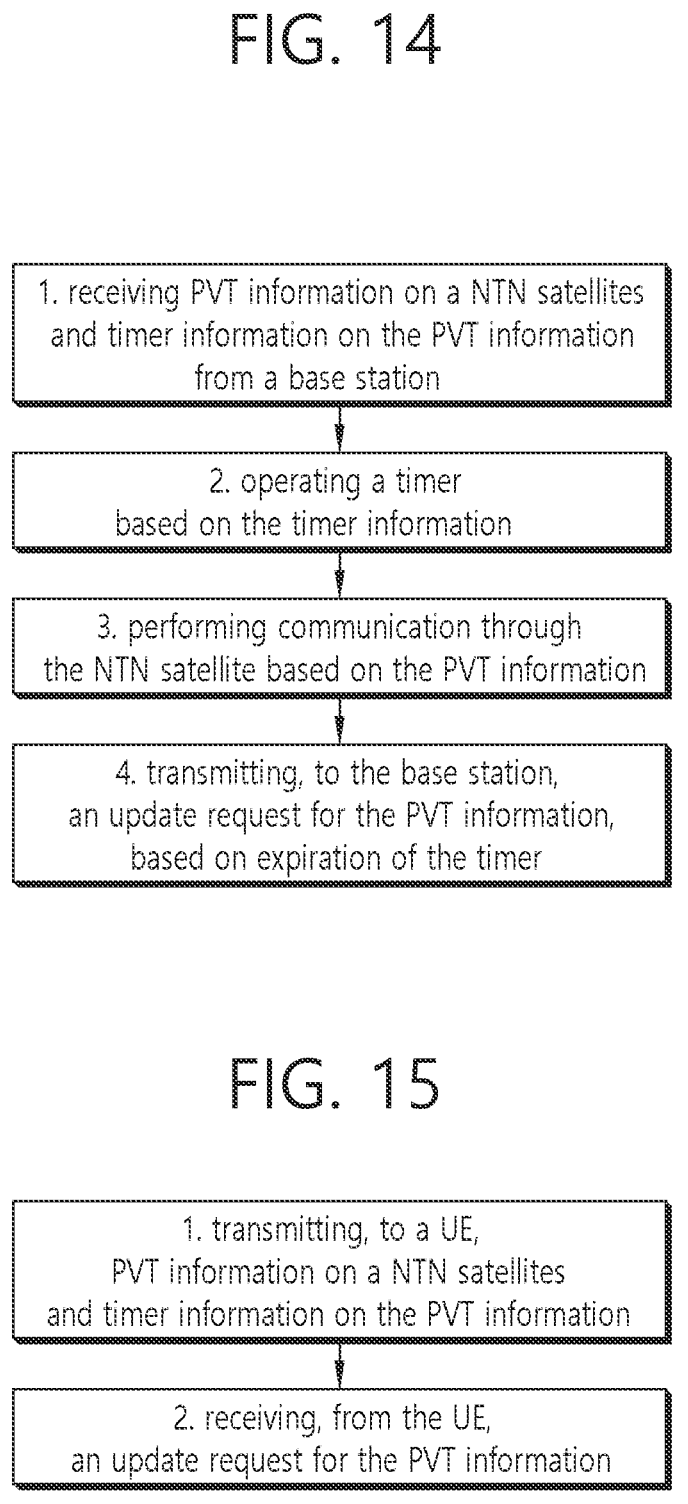

1. receiving PVT information on a NTN satellites and timer information on the PVT information from a base station 2. operating a timer based on the timer information 3. performing communication through the NTN satellite based on the PVT information 4. transmitting, to the base station, an update request for the PVT information, based on expiration of the timer

FIG. 15

1. transmitting, to a UE, PVT information on a NTN satellites and timer information on the PVT information 2. receiving, from the UE, an update request for the PVT information

OPERATION OF UE FOR UPDATING EPHEMERIS INFORMATION ON NTN SATELLITE

CROSS-REFERENCE TO RELATED APPLICATIONS

This application is a National Stage application under 35 U.S.C. § 371 of International Application No. PCT/KR2022/000552, filed on Jan. 12, 2022, which claims the benefit of Korean Patent Application No. 10-2021-0006161, filed on Jan. 15, 2021. The disclosures of the prior applications are incorporated by reference in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Management of PVT information of NTN satellite is a problem.

When the timer for PVT information expires, the UE may request an update of PVT information to the base station.

The specification may have various effects.

For example, through the procedure disclosed in the present specification, it is possible to improve the accuracy of RRM measurement, cell selection, cell reselection, and compensation for time and frequency offsets.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 14 shows a procedure of a UE according to the disclosure of the present specification.

FIG. 15 shows a procedure of a base station according to the disclosure of the present specification.

DETAILED DESCRIPTION

Figure 4:
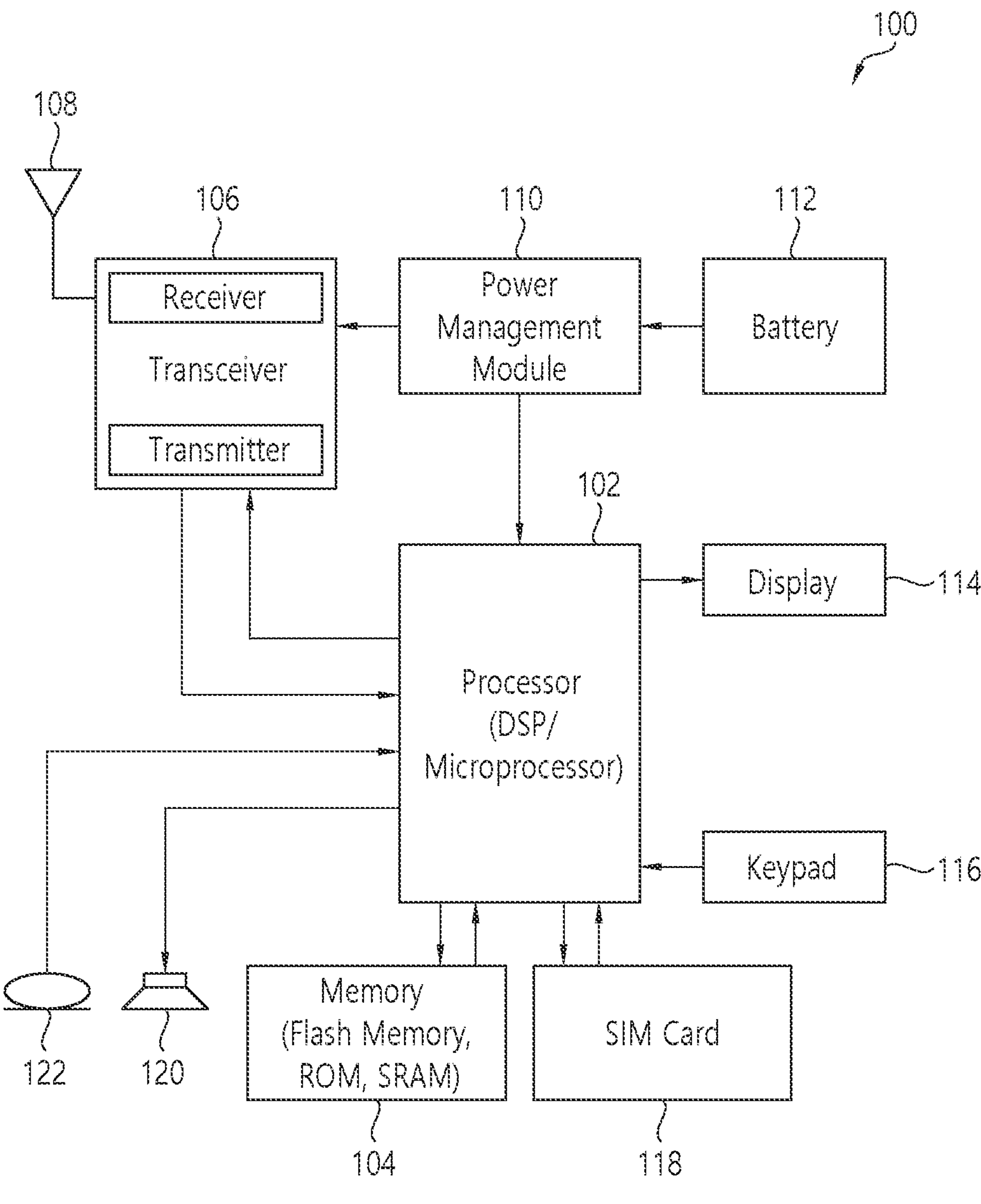
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5A:
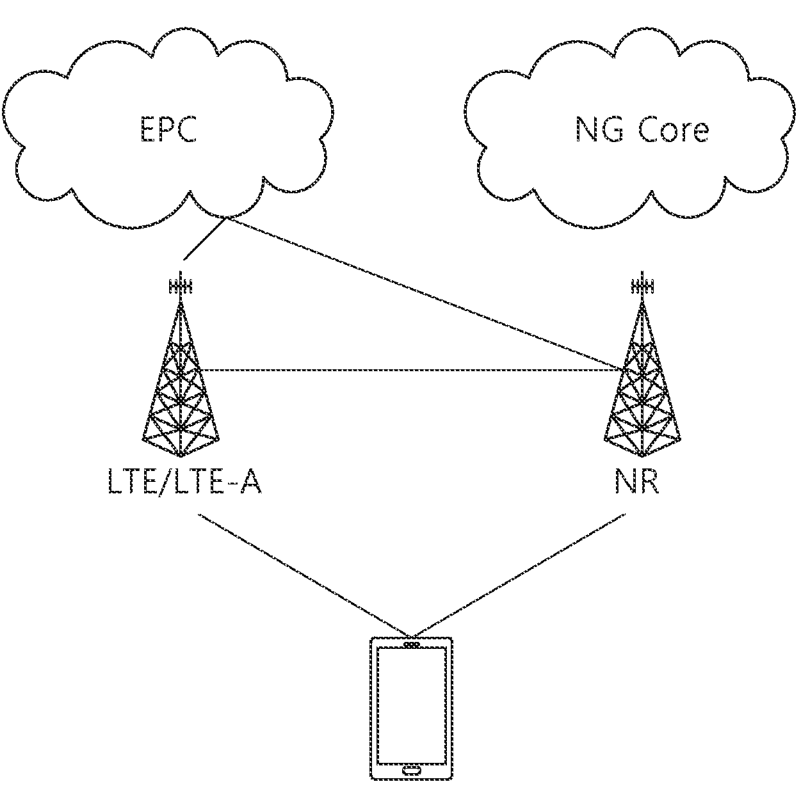
FIGS. 5*a* to 5*c* are exemplary diagrams illustrating an exemplary architecture for a service of next-generation mobile communication.
Figure 5B:
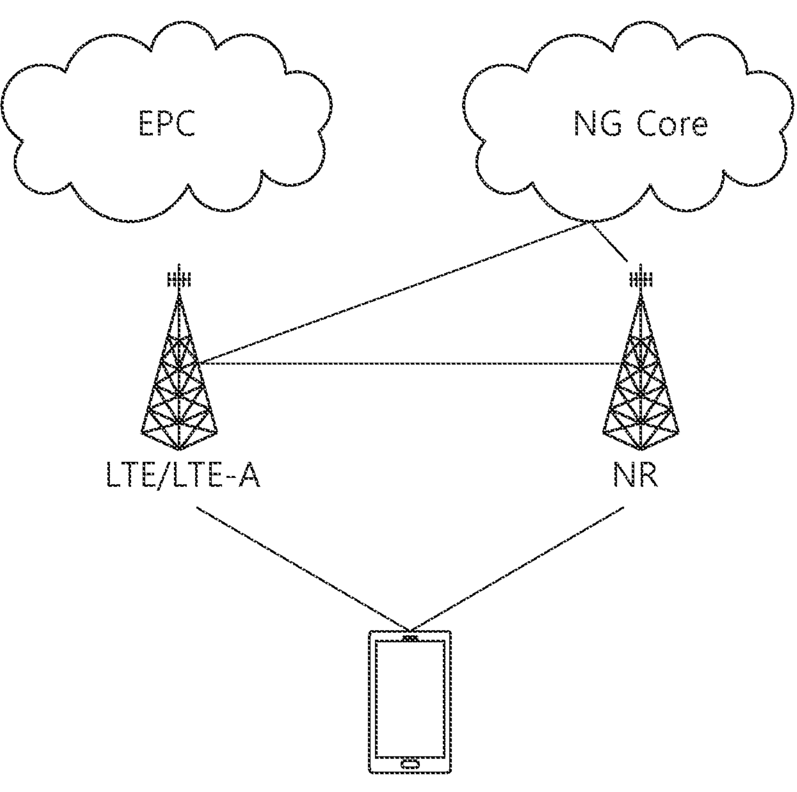
Figure 5C:
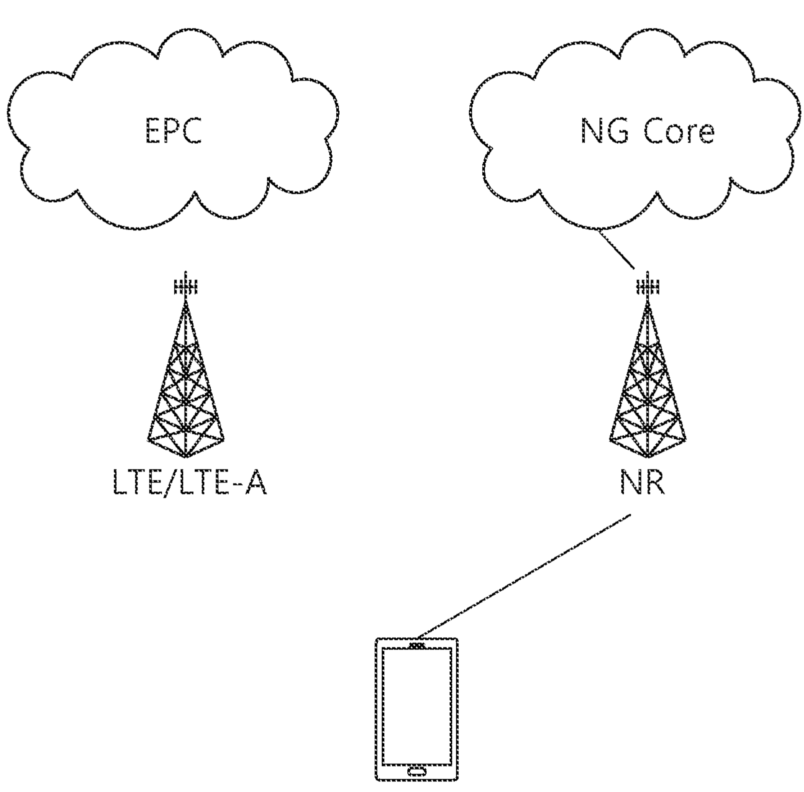

FIGS. 5*a* to 5*c* are exemplary diagrams illustrating an exemplary architecture for a service of next-generation mobile communication.

Referring to FIG. 5*a*, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 5*b*, unlike FIG. 6*a*, an LTE/LTE-A-based cell is connected to a core network for 5G mobile communication, that is, the LTE/LTE-A-based cell is connected to a Next Generation (NG) core network.

A service method based on the architecture shown in FIG. 5*a* and FIG. 5*b* is referred to as NSA (non-standalone).

Referring to FIG. 5*c*, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 6:
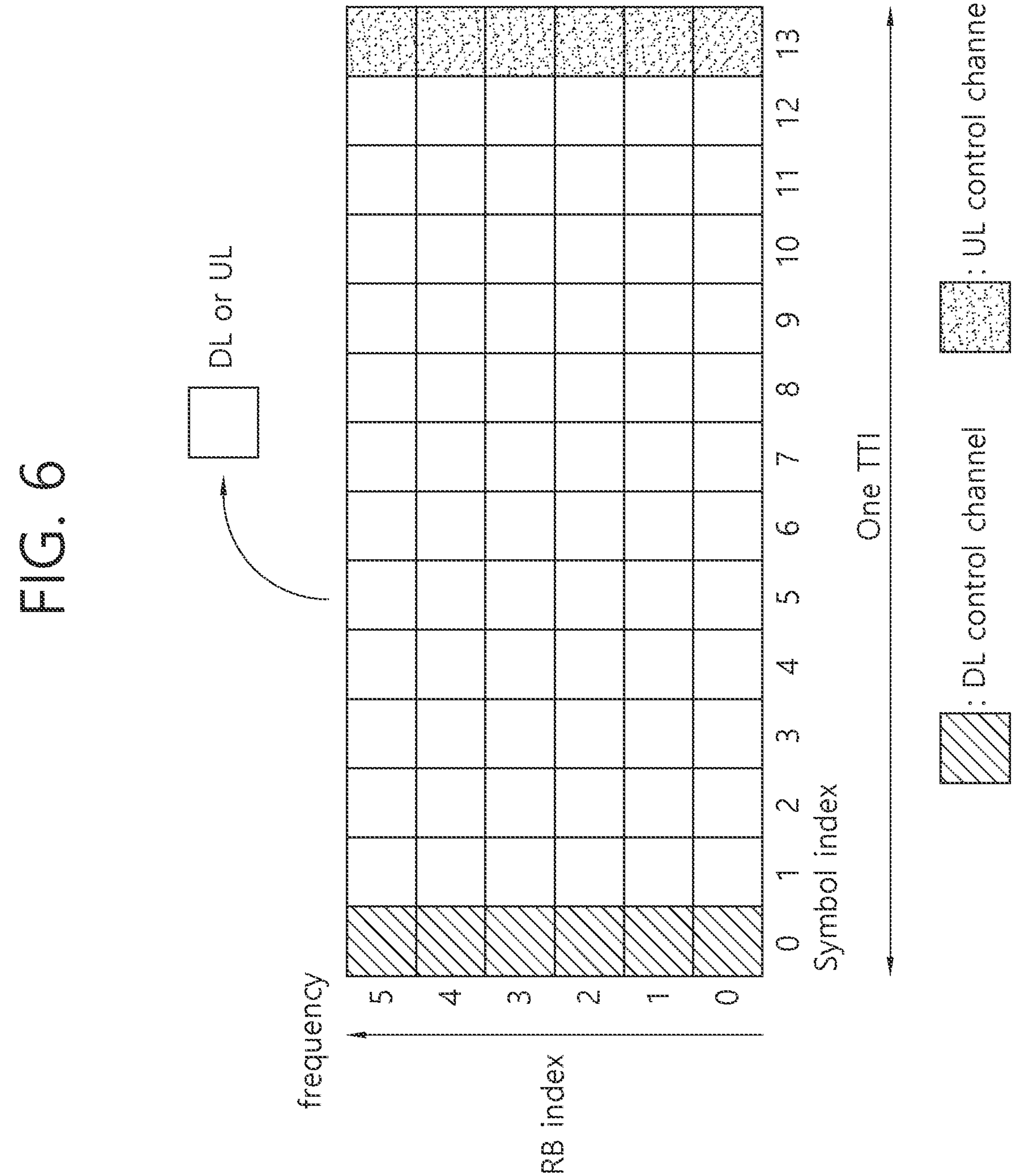
FIG. 6 shows an example of subframe types in NR.

FIG. 6 shows an example of subframe types in NR.

The TTI (transmission time interval) shown in FIG. 6 may be referred to as a subframe or a slot for NR (or new RAT). The subframe (or slot) of FIG. 6 may be used in a TDD system of NR (or new RAT) to minimize data transmission delay. As shown in FIG. 6, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot). The structure of such a subframe (or slot) may be referred to as a self-contained subframe (or slot). When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by a subcarrier spacing and a corresponding CP length may be expressed as shown in the following table.

TABLE 3

| M | $\Delta f = 2\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by the number of OLDM symbols per slot Nslotsymb, the number of slots per frame Nframe,μslot, and the number of slots per subframe Nsubframe,μslot are expressed as shown in the following table.

TABLE 4

| μ | Nslotsymb | Nframe, μslot | Nsubframe, μslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by the number of OLDM symbols per slot Nslotsymb, the number of slots per frame Nframe,μslot, and the number of slots per subframe Nsubframe,μslot are expressed as shown in the following table.

TABLE 5

| M | Nslotsymb | Nframe, μslot | Nsubframe, μslot |
|---|---|---|---|
| 2 | 12 | 40 | 4 |

Meanwhile, in next-generation mobile communication, each symbol within a symbol may be used as a downlink or an uplink as shown in the table below. In the table below, uplink is denoted by U, and downlink is denoted by D. In the table below, X represents a symbol that can be flexibly used in uplink or downlink.

TABLE 6

| for- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |

TABLE 6-continued

| for- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<NR to SS Block>

SS block (SS/PBCH block: SSB) include information necessary for the terminal to perform initial access in 5G NR, that is, a physical broadcast channel (PBCH) including a master information block (MIB) and a synchronization signal (Synchronization Signal: SS) (PSS and SSS).

In addition, a plurality of SSBs may be bundled to define an SS burst, and a plurality of SS bursts may be bundled to define an SS burst set. It is assumed that each SSB is beamformed in a specific direction, and several SSBs in the SS burst set are designed to support terminals existing in different directions, respectively.

Figure 7:
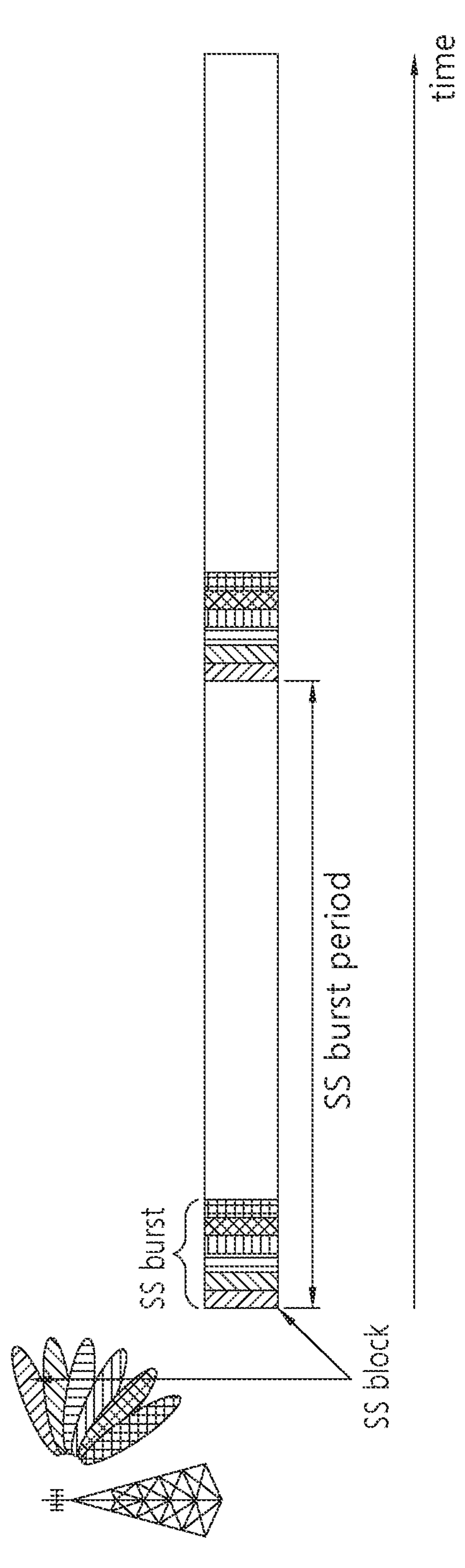
FIG. 7 is an exemplary diagram illustrating an example of an SS block in NR.

FIG. 7 is an exemplary diagram illustrating an example of an SS block in NR.

Referring to FIG. 7, the SS burst is transmitted every predetermined period. Accordingly, the terminal receives the SS block, and performs cell detection and measurement.

Meanwhile, in 5G NR, beam sweeping is performed for SS. This will be described with reference to FIG. 8.

Figure 8:
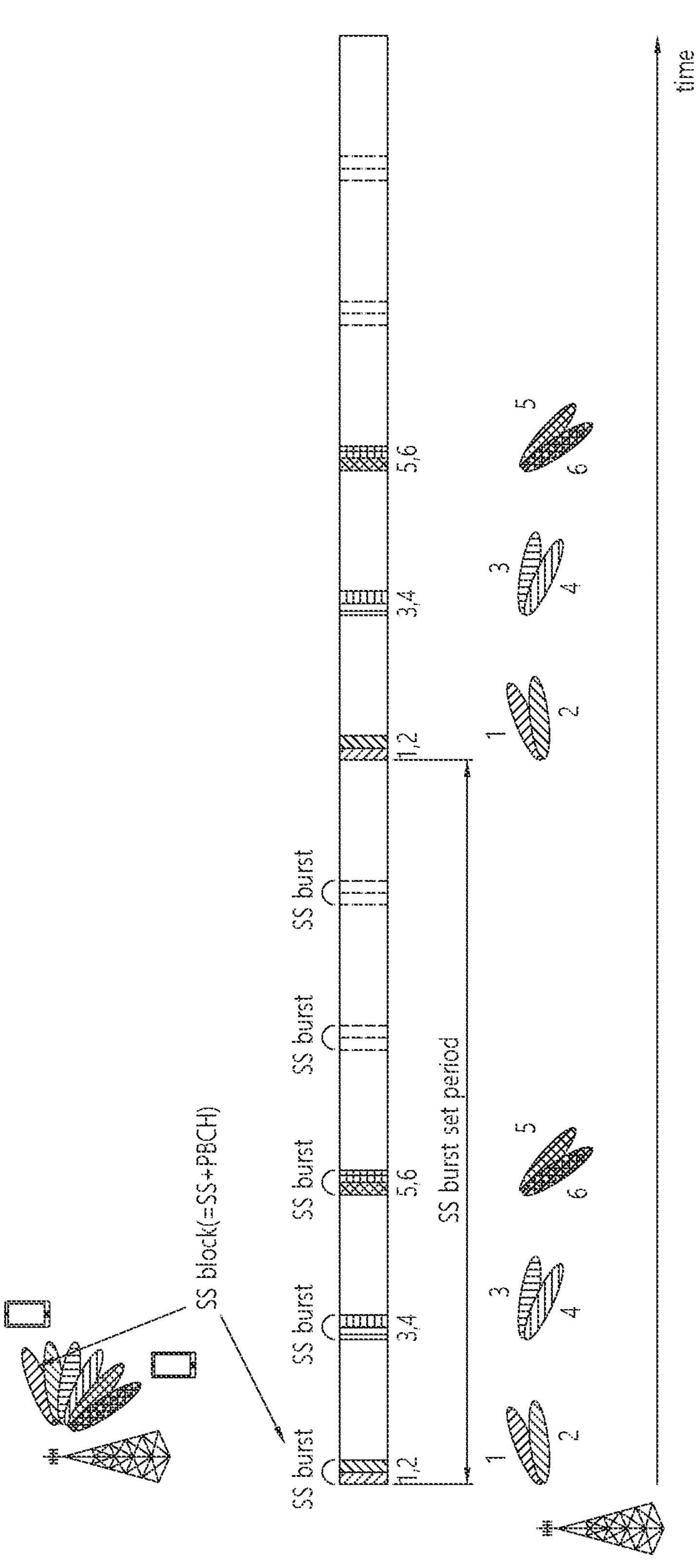
FIG. 8 is an exemplary diagram illustrating an example of beam sweeping in NR.

FIG. 8 is an exemplary diagram illustrating an example of beam sweeping in NR.

The base station transmits each SS block in the SS burst while performing beam sweeping according to time. In this case, several SS blocks in the SS burst set are transmitted to support terminals existing in different directions, respectively.

<System Information Block 2>

SIB2 may include inter-RAT cell reselection (i.e., applicable to more than one type of cell reselection, but not necessarily all) as well as inter-frequency, intra-frequency and/or non-adjacent cell reselection information.

Elements of SIB2 information include absThreshSS-BlocksConsolidation, cellEdgeEvalutation, cellReselection-InfoCommon, cellReselectionServingFreqInfo, deriveSSB-IndexFromCell, frequencyBandList, highPriorityMeasRelax, intraFreqCellReselectionInfo, low-MobilityEvalutation, MaxBlocksHystual, -qsFreqCellReselectionInfo, lowMobilityEvalutation, nrofSS-, q-RxLevM-inSUL, rangeToBestCell, relaxedMeasCondition, relaxedMeasurement, s-IntraSearchP, s-IntraSearchQ, s-NonIntraSearchP, s-NonIntraSearchQ, s-SearchDeltaP, s-SearchThresholdP, Position, s-SearchThresholdP, s-SearchCL, ssholdQ, smtQc, smtc-Common, ssb-ToMeasure, t-ReselectionNR, t-ReselectionNR-SF, threshServingLowP, threshServingLowQ, t-SearchDeltaP.

Among the information elements, the SMTC field refers to a measurement time configuration for intra-frequency measurement. If this field is absent, the UE assumes that the SSB period is 5 ms for the intra-frequency cell.

The smtc2-LP-r16 refers to a measurement timing configuration for intra-frequency neighbour cells with a Long Periodicity (LP) indicated by periodicity in smtc2-LP-r16. The timing offset and duration are equal to the offset and duration indicated in smtc in intraFreqCellReselectionInfo. The periodicity in smtc2-LP-r16 can only be set to a value strictly larger than the periodicity in smtc in intraFreqCell-ReselectionInfo (e.g., if smtc indicates sf20 the Long Periodicity can only be set to sf40, sf80 or sf160, if smtc indicates sf160, smtc2-LP-r16 cannot be configured). The pci-List, if present, includes the physical cell identities of the intra-frequency neighbour cells with Long Periodicity. If smtc2-LP-r16 is absent, the UE assumes that there are no intra-frequency neighbour cells with a Long Periodicity.

Among the information elements, ssb-ToMeasure is an SS block (SSB) set to be measured within the SMTC measurement period. When there is no field, the UE measures all SS blocks.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g., gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

Table 7 shows the types of NTNs.

TABLE 7

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with | 200-3500 km |
| UAS platform (including HAPS) | 8-50 km (20 km for HAPS) | respect to a given earth point | 5-200 km |
| High Elliptical Orbit (HEO) satellite | 400-50000 km | Elliptical around the earth | 200-3500 km |

<Non-Terrestrial Networks>

A non-terrestrial network refers to a network, or segment of networks using RF resources on board a satellite (or UAS platform).

There are two common scenarios of NTN providing access to user equipment: transparent payload and regenerative payload.

NTNs are typically characterized by the following elements:

One or several sat-gateways that connect the Non-Terrestrial Network to a public data network A GEO satellite is fed by one or several sat-gateways which are deployed across the satellite targeted coverage (e.g., regional or even continental coverage). We assume that UE in a cell is served by only one sat-gateway A Non-GEO satellite served successively by one or several sat-gateways at a time. The system ensures service and feeder link continuity between the successive serving sat-gateways with sufficient time duration to proceed with mobility anchoring and handover A Feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generates beams typically generate several beams over a given service area bounded by its field of view. The footprints of the beams are typically of elliptic shape. The field of view of a satellite (or UAS platforms) depends on the on-board antenna diagram and min elevation angle.

Typically, GEO satellite and UAS are used to provide continental, regional or local service. Typically, a constellation of LEO and MEO is used to provide services in both Northern and Southern hemispheres. In some case, the constellation can even provide global coverage including polar regions. For the later, this requires appropriate orbit inclination, sufficient beams generated and inter-satellite links.

<Problems to be Solved in the Disclosure of this Specification>

Figure 9:
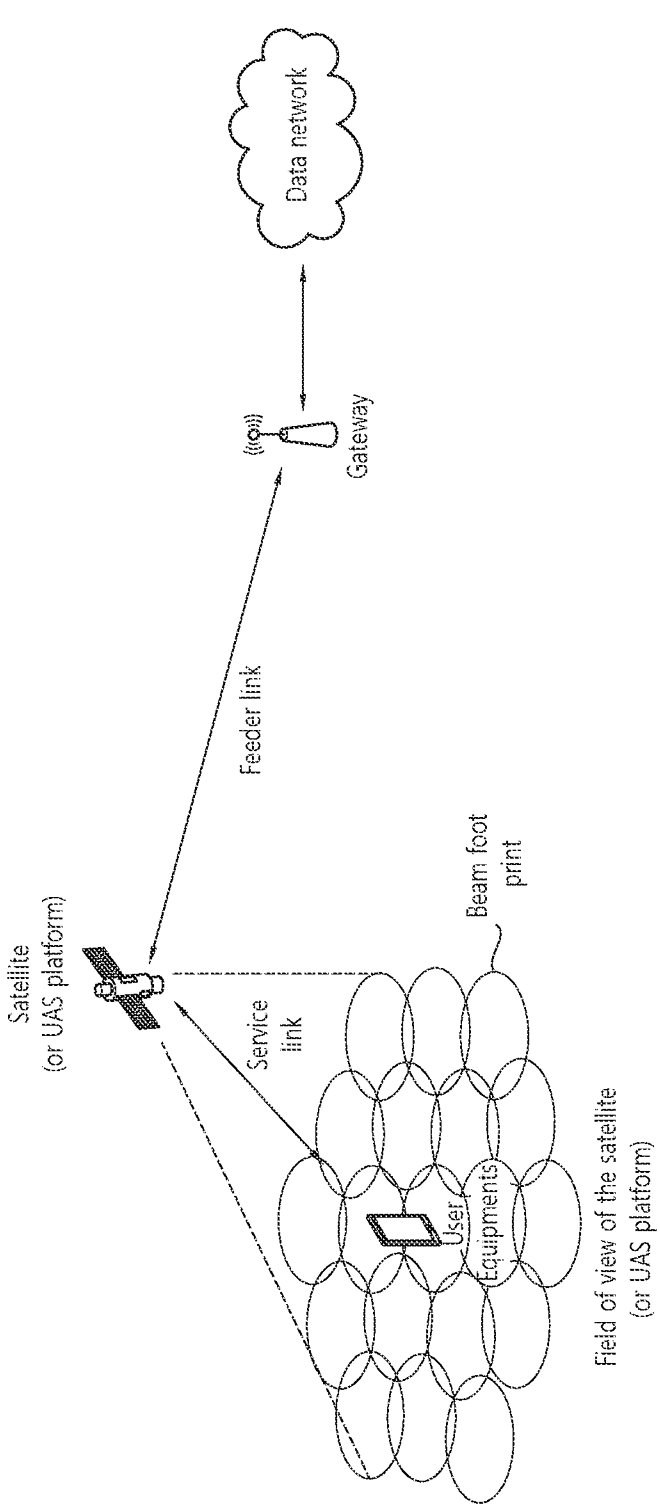
FIG. 9 is an exemplary diagram illustrating an example of an NTN.

FIG. 9 is an exemplary diagram illustrating an example of an NTN.

NR-based NTN (non-terrestrial network) communication was introduced as a method for efficiently providing communication services to areas where terrestrial network services are not provided through satellites (geostationary satellite GEO, low-orbit satellite LEO, etc.) as shown in FIG. 9. In the case of a transparent satellite, the satellite amplifies the signal transmitted from the terrestrial base station (gNB-NTN gateway). And in the case of a regenerative satellite, the satellite performs function of terrestrial base station such as routing, coding and decoding modulation. An NTN terminal as a GPS function and periodically receives location, time, and speed information for NTN satellites.

When a satellite, a base station and a terminal transmit/receive radio wave, the propagation delay refers to a delay in receiving a radio wave transmitted from one side at the other side. The propagation delay includes a propagation delay between a base station and a satellite and a propagation delay between a satellite and a terminal. The propagation delay between the base station and the satellite can be obtained by calculating based on the position of the terrestrial base station with the satellite. The propagation delay between the satellite and the terminal can be calculated by dividing the speed of light by the distance between the terminal and the satellite. The propagation delay in the present specification may relate to a propagation delay between satellites and terminals.

Unlike terrestrial base stations, satellites have a distance of about 600 km (based on LEO satellites) from terminals, so signal propagation delay is greatly increased. In case of transparent satellite, propagation delay includes service link and feeder link, and propagation delay of regenerative satellite is only considered service link.

As a result, when the terminal performs operations such as RRM measurement for signals from satellites, cell selection/reselection, and compensation for time/frequency offset, the long propagation delay may be overcome by using information such as position/velocity/time of the satellite and location information of the NTN terminal. For example, the position/velocity/time information of the NTN satellite may be extracted by the NTN gateway (gNB) using the ephemeris parameter of the NTN satellite, and the NTN gateway (gNB) may transmit the NTN terminal through the System Information Block (SIB).

Table 8 shows examples of ephemeris parameters.

TABLE 8

| | | |
|---|---|---|
| Orbital plane parameters | $a^{0.5}$ | Square root of semi major axis (semi-major axis) |
| | E | Eccentricity (eccentricity) |
| | $i_0$ | Inclination angle at reference time (inclination) |
| | $\Omega_0$ | Longitude of ascending node of orbit plane (right ascension of the ascending node) |
| | $\Omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

$a^{0.5}$ is the square root of the semi-major axis.
E is the eccentricity.
$i_0$ is the inclination angle at the reference time.
$\Omega_0$ is Longitude of ascending node of orbit plane (right ascension of the ascending node).
$\omega$ is the argument of perigee (argument of periapsis).
$M_0$ is the mean anomaly at reference time (true anomaly and a reference point in time).
$t_{0e}$ is the ephemeris reference time (the epoch).

Figure 10:
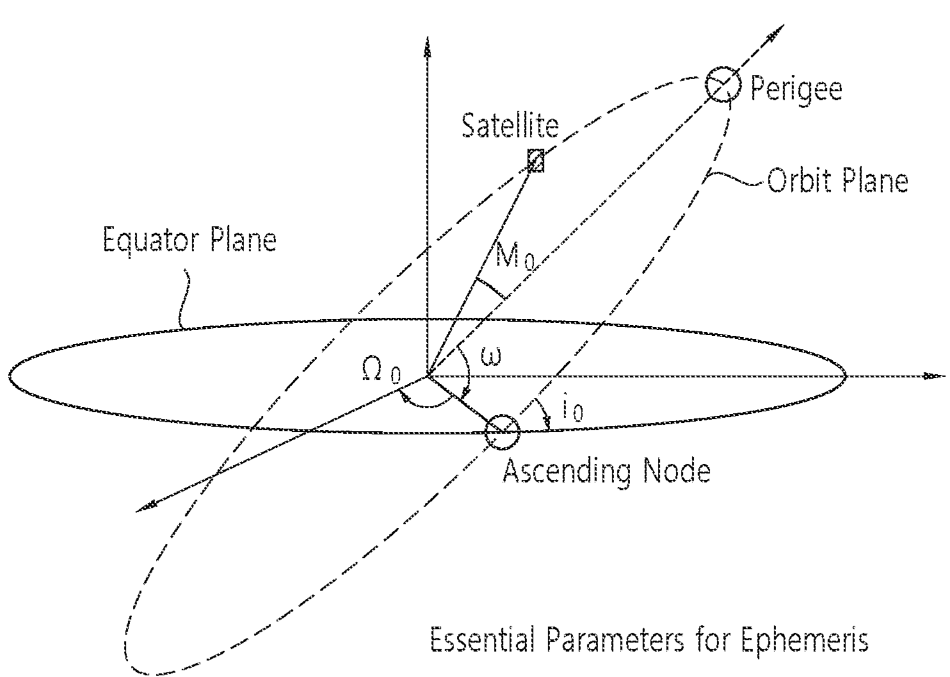
FIG. 10 is an exemplary view showing an example of an ephemeris parameter.

FIG. 10 is an exemplary view showing an example of an ephemeris parameter.

Figure 11:
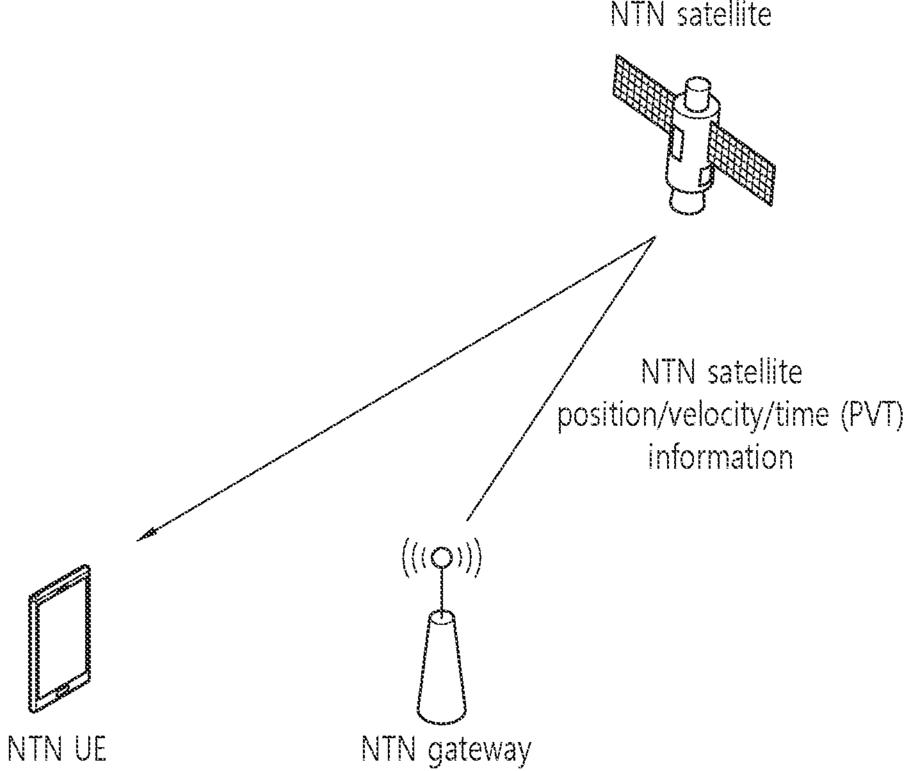
FIG. 11 is an exemplary diagram illustrating an example of NTN communication.

FIG. 11 is an exemplary diagram illustrating an example of NTN communication.

If the update of the position/velocity/time information of the NTN satellite becomes unstable, the accuracy of the position/velocity/time of the NTN satellite decreases, accuracy for RRM measurement, cell selection/reselection, compensation for time/frequency offset may be lowered and overall performance of NTN communication may be deteriorated.

<Disclosure of the Present Specification>

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of the present specification may be composed of a combination of one or more operations/configurations/steps described below. The following methods described below may be performed or used in combination or complementary.

The present specification may provide a method for operating an NTN terminal in consideration of an unstable update of information on the position/velocity/time of an NTN satellite.

The following drawings are made to explain a specific example of the present specification. Since the names of specific devices or names of specific signals/messages/fields described in the drawings are provided as examples, the technical features of the present specification are not limited to the specific names used in the drawings below.

1. Timer Setting and Request

Figure 12:
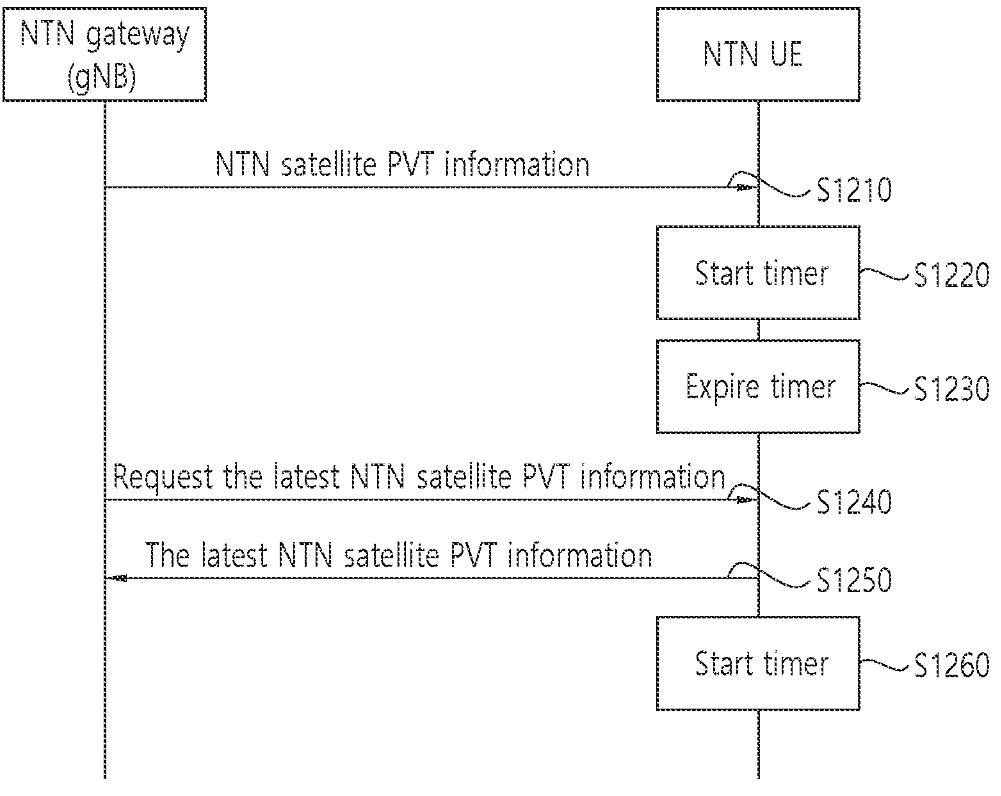
FIG. 12 is a flowchart showing an example of the first embodiment.

FIG. 12 is a flowchart showing an example of the first embodiment.

Since the orbit of the NTN satellite is not always constant, the gNB (NTN gateway) may periodically update the ephemeris information to the NTN terminal. The ephemeris information may be PVT (Position, Velocity and Time) information.

The NTN terminal may perform operations such as RRM measurement, cell selection/reselection, and time/frequency offset compensation using the updated PVT information of the NTN satellite.

The gNB may transmit PVT information of NTN satellites to the UE (S1210). The gNB may transmit a timer value for the PVT information to the UE.

When receiving the PVT information of the NTN satellite from the NTN gateway (gNB), the NTN terminal may update the PVT information of the NTN satellite and operate a timer for the PVT information (S1220).

Table 9 shows examples of timers for PVT information of NTN satellites.

TABLE 9

| Timer | start | stop | At expiry |
|---|---|---|---|
| Txxx | Upon receiving satellite PVT information with satellite ID | Upon excluding satellite ID from the list of monitoring satellites | Initiate the latest PVT information request procedure |

The timer may be started when PVT information is received. The timer may be stopped when the ID of the corresponding satellite is excluded from the list of satellites monitored by the terminal. When the timer expires, a procedure for requesting the latest PVT information may be started. The value for the timer (e.g., 1 second) may be set down by the NTN gateway (gNB). The NTN terminal may perform operations such as RRM measurement, cell selection/reselection, time/frequency offset compensation, etc. using the updated PVT information of the NTN satellite. If the corresponding NTN satellite is excluded from the list of NTN satellites to be monitored, the timer for the corresponding NTN satellite may be stopped.

When the timer expires (S1230), the NTN terminal may request the latest PVT information of the NTN satellite to the NTN gateway (gNB). (S1240)

Then, the NTN gateway (gNB) may provide, to the NTN terminal, PVT information of the NTN satellite it currently has. (S1250)

When the NTN terminal receives new PVT information of the NTN satellite from the NTN gateway (gNB), the NTN terminal may update the PVT information of the NTN satellite and operate the timer for the PVT information again (S1260).

2. Use of Timer Expired Information

The NTN terminal may perform RRM measurement, cell selection/reselection, and time/frequency offset compensation using the existing PVT information of the NTN satellite after the timer expires and before the PVT information of the NTN satellite is updated.

In this case, the NTN terminal may inform the NTN gateway (gNB) that the performance accuracy for this operation may be low. Then, the NTN gateway (gNB) may control NTN communication in consideration of this point. Here, that the NTN gateway (gNB) controls NTN communication means that measurement information or signal reported by the UE may not be reflected in scheduling operations, which is an NTN gateway (gNB) implementation issue. That is, the NTN gateway (gNB) may not reflect measurement information or signal reported by the UE in scheduling operation. Alternatively, NTN communication may be controlled by other methods.

Figure 13:
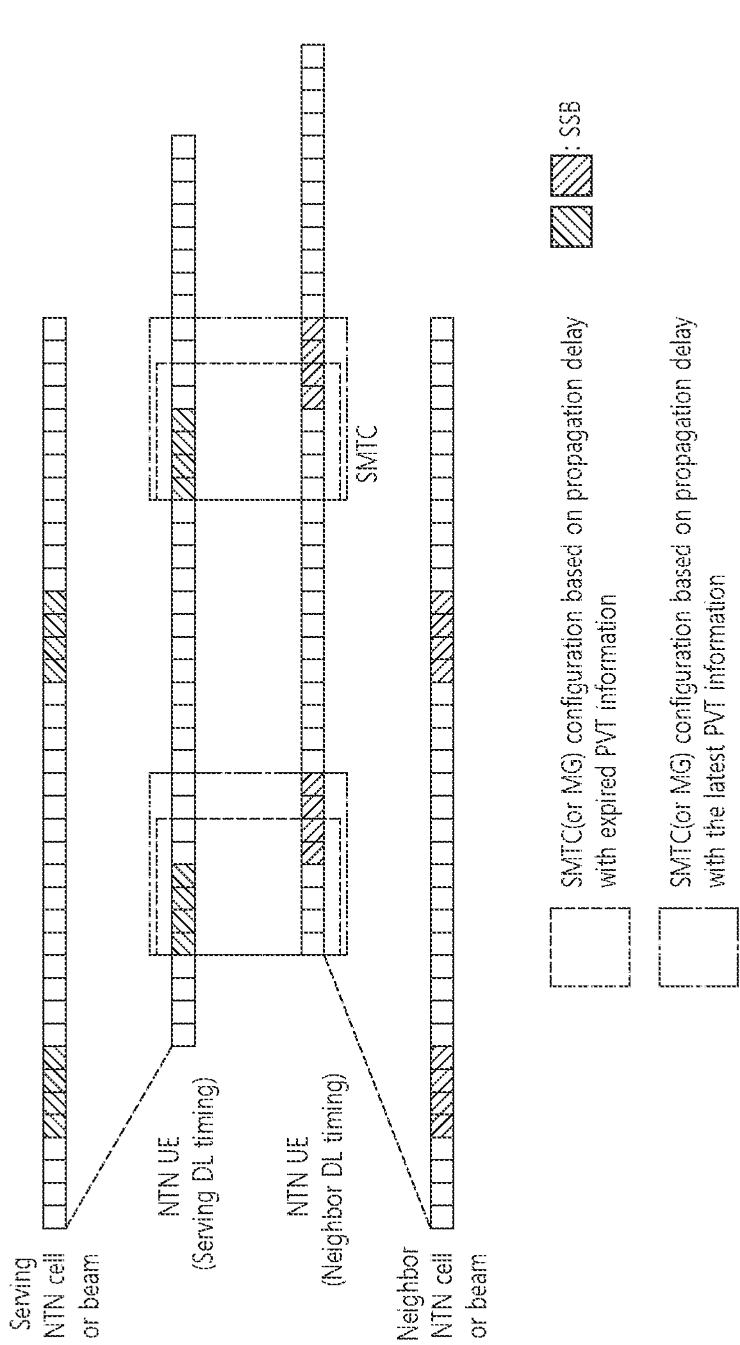
FIG. 13 shows an example of RRM measurement using expired PVT information

FIG. 13 shows an example of RRM measurement using expired PVT information

If expired PVT information of an NTN satellite that is not updated is used during RRM measurement, as shown in FIG. 13, the gNB may incorrectly set offset or duration for SMTC/MG/CMTC configuration because the accuracy of the propagation delay of the NTN UE is lowered. Then, SSB or CSI-RS may not be properly measured within the SMTC/MG/CMTC measurement window for measuring SSB or CSI-RS. Therefore, the accuracy of RRM measurement may be lowered.

At this time, when the NTN terminal performs RRM measurement reporting, it may transmit information that the measurement has used the PVT information for which the timer has expired to the base station together. Information indicating that the NTN satellite PVT information for which the timer has expired has been used may be expiredPVTInfo.

Table 10 shows an example of a message transmitted from the terminal to the base station when the terminal performs measurement using the PVT information for which the timer has expired.

TABLE 10

| | | | | | |
|---|---|---|---|---|---|
| MeasResultNR | PhysCellId | | | PhysCellId | optional |
| | measResult | cellResults | resultsSSB-Cell | MeasQuantityResults | optional |
| | | | resultsCSI-RS-Cell | MeasQuantityResults | optional |
| | | rsIndexResults(optional) | resultsSSB-Indexes | ResultsPerSSB-IndexList | optional |
| | | | resultsCSI-RS-Indexes | ResultsPerCSI-RS-IndexList | optional |
| | | expiredPVTIfno | BOOLEAN | | OPTIONAL |
| | cgi-Info | CGI-InfoNR | | | OPTIONAL |

When the UE performs measurement using the PVT information for which the timer has expired, the UE may transmit MeasResultNR as a measurement result to the base station. MeasResultNR may include PhysCellId, measResult, and cgi-Info.

measResult may include cellResults, rsIndexResults and expiredPVTIfno.

expiredPVTIfno may indicate that the corresponding measurement result is a result measured using PVT information for which a timer has expired.

This information may be equally applied to signal transmission through other measurement and time/frequency offset compensation.

When the terminal reports RRM measurement result with expiredPVTInfo, the base station may perform the following operations based on the corresponding information.

i) Even if the terminal does not request the PVT information of the NTN satellite, the latest updated PVT information of the NTN satellite may be provided to the terminal.

ii) The base station may set a margin in the length of the SMTC interval so that the terminal can perform RRM measurement based on SSB or CSI-RS within the SMTC interval and reset it to the UE.

iii) When the base station instructs a handover or performs scheduling, the base station may exclude the RRM measurement result and CSI reported by the terminal. In addition, when the base station instructs a handover, the base station may exclude a corresponding neighbor cell that has performed measurement with expiredPVTInfo from the handover target cell.

FIG. 14 shows a procedure of a UE according to the disclosure of the present specification.

1. The UE may receive ephemeris information on a NTN (Non-Terrestrial Networks) satellites and timer information on the ephemeris information from a base station serving as a NTN gateway.
2. The UE may operate a timer based on the timer information.
3. The UE may perform communication through the NTN satellite based on the ephemeris information.
4. The UE may transmit, to the base station, an update request for the ephemeris information, based on expiration of the timer.

The UE may perform RRM (Radio Resource Management) measurement based on the ephemeris information.

The UE may perform cell selection and reselection based on the ephemeris information.

The UE may determine time and frequency offset based on the ephemeris information.

The UE may perform RRM measurement using the ephemeris information after timer expires.

The UE may transmit, to the base station, a measurement report.

The measurement report may include a result of the RRM measurement. The measurement report may include information that the RRM measurement was performed using the ephemeris information after the timer expired.

The UE may stop the operated timer based on the exclusion of the NTN satellite from the list of NTN satellites that the UE needs to monitor.

FIG. 15 shows a procedure of a base station according to the disclosure of the present specification.

1. The base station may transmit, to a UE (User Equipment), ephemeris information on a NTN (Non-Terrestrial Networks) satellites and timer information on the ephemeris information.
2. The base station may receive, from the UE, an update request for the ephemeris information.

The update request for the ephemeris information may be based on expiration of the timer.

The base station may transmit, to the UE, updated ephemeris information.

The base station may receive, from the UE, a measurement report.

The measurement report may include information that RRM measurement was performed using the ephemeris information after the timer expired. The measurement report may include a result of the RRM measurement.

Hereinafter, a processor for providing mobile communication according to some embodiments of the present specification will be described.

The processor performs operation, which is comprising: receiving ephemeris information on a NTN (Non-Terrestrial Networks) satellites and timer information on the ephemeris information from a base station serving as a NTN gateway; operating a timer based on the timer information; performing communication through the NTN satellite based on the ephemeris information; and transmitting, to the base station, an update request for the ephemeris information, based on expiration of the timer.

Hereinafter, a non-volatile computer-readable medium storing one or more instructions for providing mobile communication m according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random-access memory (SDRAM), read-only memory (ROM), or non-volatile random-access memory (NVRAM). Read-only memory (EEPROM), flash memory, magnetic or optical data storage media, or other media that can be used to store instructions or data structures. Non-volatile computer readable media may also include combinations of the above.

Further, the methods described herein may be realized at least in part by computer-readable communication media that carry or carry code in the form of instructions or data structures, and which can be accessed, read, and/or executed by a computer.

According to some embodiments of the present disclosure, a non-transitory computer-readable medium has one or more instructions stored thereon. The stored one or more instructions may be executed by a processor of the UE.

The stored one or more instructions cause the processor to perform operation, which is comprising: receiving ephemeris information on a NTN (Non-Terrestrial Networks) satellites and timer information on the ephemeris information from a base station serving as a NTN gateway; operating a timer based on the timer information; performing communication through the NTN satellite based on the ephemeris information; and transmitting, to the base station, an update request for the ephemeris information, based on expiration of the timer.

The specification may have various effects.

For example, through the procedure disclosed in the present specification, it is possible to improve the accuracy of RRM measurement, cell selection, cell reselection, and compensation for time and frequency offsets.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

The claims described herein may be combined in various ways. For example, the technical feature of the method claims of the present specification may be combined and implemented as an apparatus, and the technical features of the apparatus claims of the present specification may be combined and implemented as a method. In addition, the technical feature of the method claims of the present specification and the technical features of the apparatus claims may be combined to be implemented as an apparatus, and the technical feature of the method claims and the technical features of the apparatus claims of the present specification may be combined and implemented as a method. Other implementations are within the scope of the following claims.

What is claimed is:

1. A method comprising:

receiving, by a user equipment (UE), ephemeris information on a Non-Terrestrial Networks (NTN) satellite and a timer value related to the ephemeris information from a base station;

starting, by the UE, a timer with the timer value for the ephemeris information; and performing, by the UE, measurement based on the ephemeris information after the timer expires; and transmitting, by the UE to the base station, a result of the measurement and information that the result of the measurement is a result measured based on the ephemeris information after the timer expires.

2. The method of claim 1, further comprising:

receiving, by the UE from the base station, updated ephemeris information on the NTN satellite.

3. The method of claim 1, further comprising:

stopping the operated timer based on the exclusion of the NTN satellite from a list of NTN satellites that the UE needs to monitor.

4. A method comprising:

transmitting, by a base station to a User Equipment (UE), ephemeris information on a Non-Terrestrial Networks (NTN) satellite and a timer value related to the ephemeris information; and wherein the NTN satellite serves access for the UE, receiving, by the base station from the UE, a result of measurement performed by the UE and information that the result of the measurement is a result measured based on the ephemeris information after a timer with the timer value expires.

5. The method of claim 4, further comprising:

transmitting, by the base station to the UE, updated ephemeris information on the NTN satellite.

6. A user equipment, UE, comprising:

at least one memory; and at least one processor operably connectable to the at least one memory, wherein the at least one memory stores instructions that, based on being executed by the at least one processor, cause the at least one processor to perform operations comprising:

receiving ephemeris information on a Non-Terrestrial Networks (NTN) satellite and a timer value related to the ephemeris information from a base station;

performing measurement based on the ephemeris information after the timer expires; and transmitting, to the base station, a result of the measurement and information that the result of the measurement is a result measured based on the ephemeris information after the timer expires.

7. The UE of claim 6, wherein the operation further comprises:

receiving, from the base station, updated ephemeris information on the NTN satellite.

8. The UE of claim 6, wherein the operation further comprises:

performing cell selection or reselection based on the ephemeris information.

9. The UE of claim 6, wherein the operation further comprises:

stopping the operated timer based on the exclusion of the NTN satellite from a list of NTN satellites that the UE needs to monitor.

* * * * *